(12) United States Patent
Bai et al.

(10) Patent No.: US 8,733,314 B2
(45) Date of Patent: May 27, 2014

(54) APPARATUS FOR REDUCING ENGINE TORQUE FLUCTUATIONS

(75) Inventors: Shushan Bai, Ann Arbor, MI (US); Donald L. Dusenberry, Farmington Hills, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 394 days.

(21) Appl. No.: 13/286,919

(22) Filed: Nov. 1, 2011

(65) Prior Publication Data
US 2013/0104693 A1    May 2, 2013

(51) Int. Cl.
*F02B 75/06*    (2006.01)

(52) U.S. Cl.
USPC .................................. 123/192.1; 74/572.2

(58) Field of Classification Search
USPC ....................................... 123/192.1; 74/572.2
See application file for complete search history.

(56) References Cited

FOREIGN PATENT DOCUMENTS

WO    WO2008145342 A1    12/2008

*Primary Examiner* — Noah Kamen

(57) ABSTRACT

An apparatus for reducing torque fluctuations of a combustion engine includes a crankshaft mounted in the engine, flywheel coupled to the crankshaft, and a first actuator and a second actuator coupled to the flywheel. The flywheel generates a counter torque to the torque generated by the engine during combustion, and the first and the second actuators are operated to adjust the magnitude and the phase of the counter torque generated by the flywheel to suppress fluctuations associated the engine torque.

20 Claims, 4 Drawing Sheets

APPARATUS FOR REDUCING ENGINE TORQUE FLUCTUATIONS

FIELD

The present invention relates to an apparatus for reducing engine torque fluctuations. More specifically, the present invention relates to an apparatus for reducing the rotational irregularities of a crankshaft in an internal combustion engine.

BACKGROUND

The statements in this section merely provide background information related to the present disclosure and may or may not constitute prior art.

Generally, the rotation of the crankshaft of internal combustion engines is not uniform because of the work cycles associated with the pistons of the engines. This non-uniformity increases with decreasing number of cylinders, low speeds, and high loads. Attempts to counteract these rotation irregularities include torsionally connecting a large mass to the crankshaft. For example, a linkage system has been employed between a flywheel and a crankshaft so that the flywheel oscillates relatively to the crankshaft the same number of times per crankshaft revolution as the combustion event. The linkage is arranged such that the counter torque generated by the oscillations of the flywheel is in the opposite direction of the engine torque. In these arrangements, however, only the magnitude (and not the phase) of the counter torque generated by the flywheel oscillation is adjustable, even though both the phase and the magnitude of the engine torque fluctuation changes with the engine speed and load.

SUMMARY

In view of the foregoing, there is a need to be able to adjust both the phase and magnitude of the flywheel oscillation relative to the crankshaft angular position. Accordingly, in an aspect of the invention, an apparatus for reducing torque fluctuations of a combustion engine includes a crankshaft mounted in the engine, flywheel coupled to the crankshaft, and a first actuator and a second actuator coupled to the flywheel. The flywheel generates a counter torque to the torque generated by the engine during combustion, and the first and the second actuators are operated to adjust the magnitude and the phase of the counter torque generated by the flywheel to suppress fluctuations associated the engine torque.

Further features, advantages, and areas of applicability will become apparent from the following description and appended drawings and from the claims. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

The following description is merely exemplary in nature and is not intended to limit the present disclosure, application, or uses.

Figure 1:
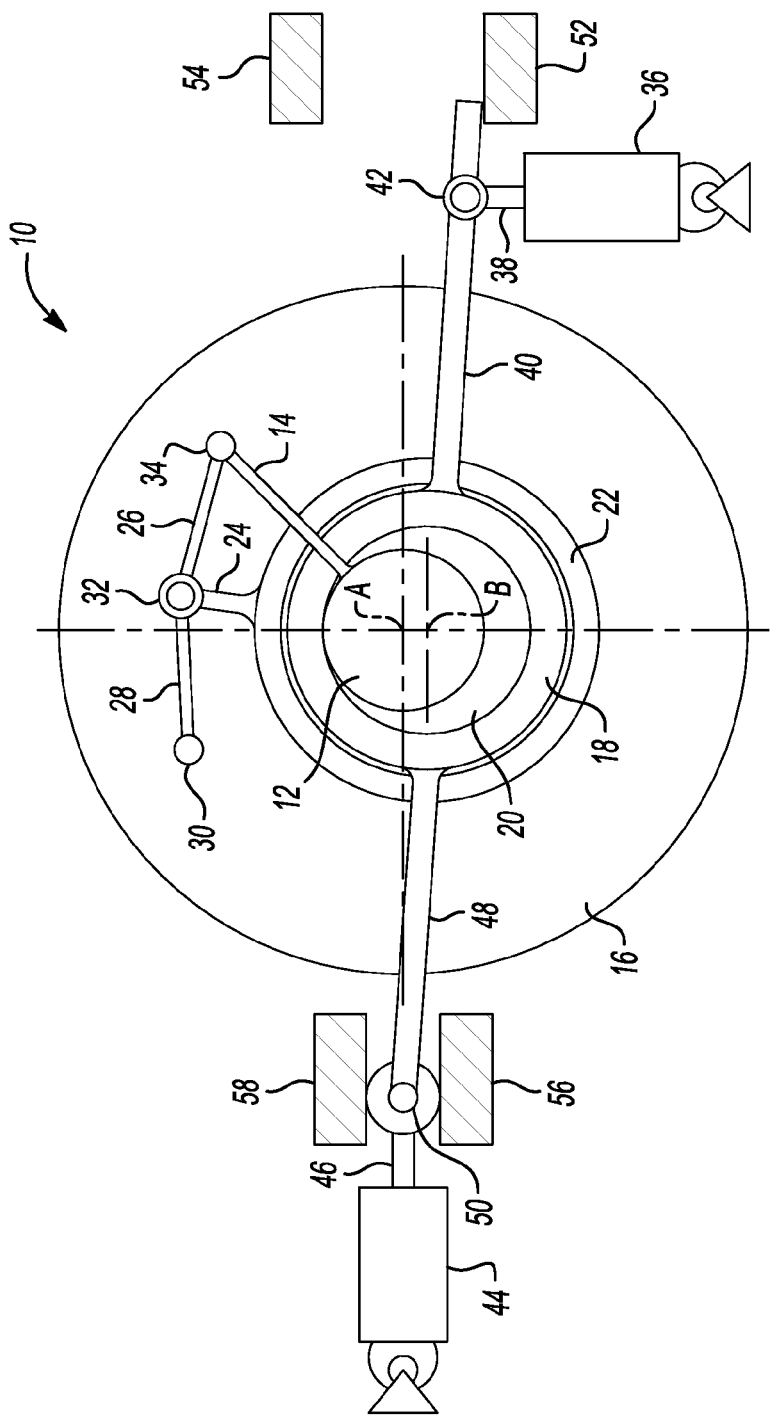
FIG. 1 is a front view of an apparatus for reducing engine torque fluctuations in accordance with the principles of the invention.
Figure 2:
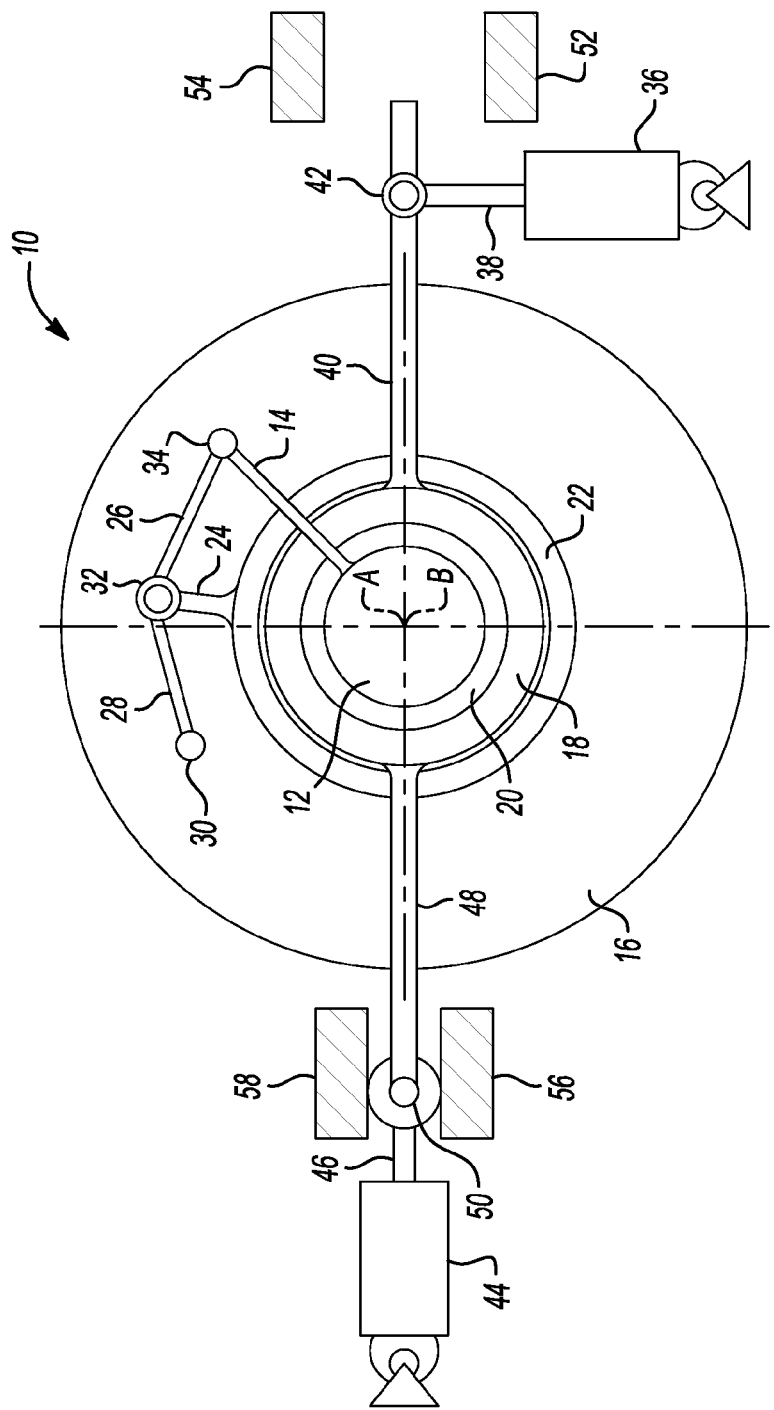
FIG. 2 is a front view of the apparatus in another state.
Figure 3:
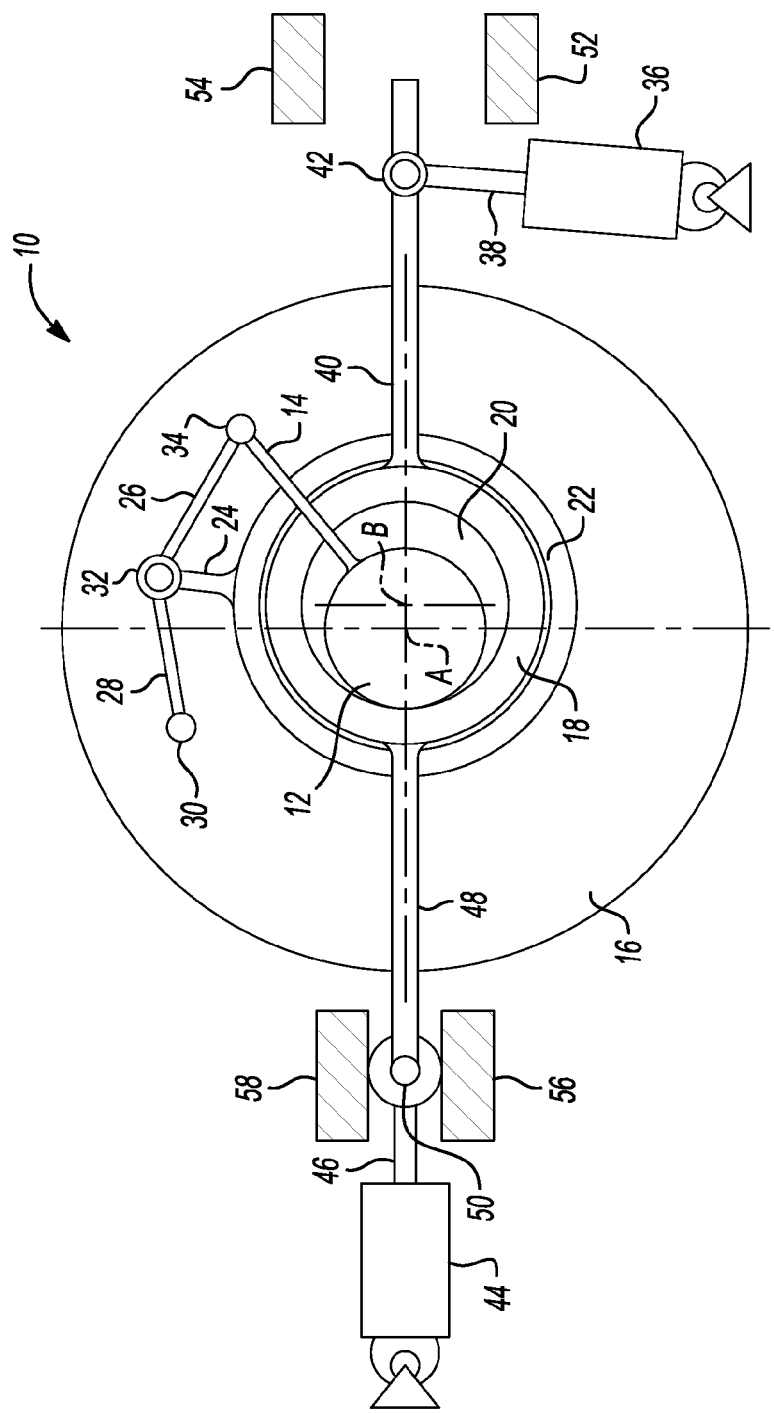
FIG. 3 is a front view of the apparatus in yet another state.
Figure 4:
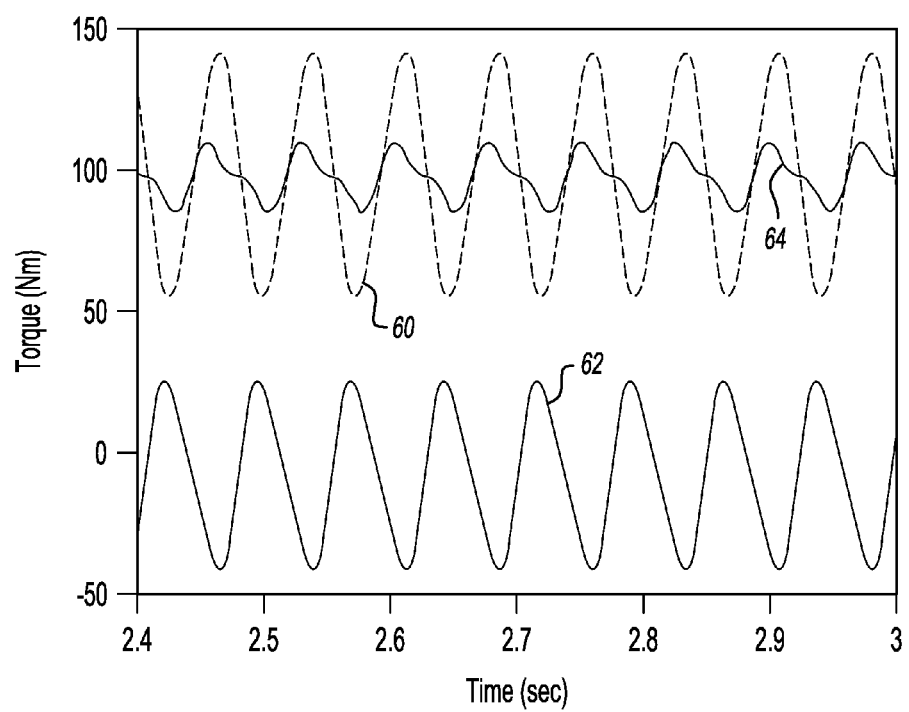
FIG. 4 is graph of torque versus time illustrating the reduction of engine torque fluctuations by flywheel counter torque in accordance with the principles of the invention.

Referring now to the drawings, an apparatus embodying the principles of the present invention is illustrated in FIGS. 1 through 3 and designated as 10. As its primary components, the apparatus 10 includes crankshaft 12 with a radially protruding arm 14. The crankshaft 12 is connected to a piston of a reciprocating internal combustion engine with a connecting rod and rotates about an axis A. The arm 14 can be connected to the crankshaft 12 or can be formed integrally with the crankshaft 12. A flywheel 16 is mounted adjacent the arm 14, and a control ring 18 is axially adjacent to the flywheel 16.

A circular coupling 22 is mounted about control ring 18 and includes a protruding radial arm 24. The radial arm 24 is connected to coupling members 26 and 28 at a hinge or pivot pin 32. The coupling element 26 is also connected to the arm 14 at a hinge or pivot pin 34, and the coupling element 28 is connected to the flywheel 16 at a hinge or pivot pin 30. The coupling members 26 and 28 are hinged coaxially to the arm 24 of the circular coupling 22 at the pivot pin 32. The pivot axes of the joints 30, 32 and 34 are parallel to each other and to the rotational axis A of the crankshaft 12.

The control ring 18 pivots and the circular coupling 22 rotates about a rotational axis B. The control ring 18 includes two protruding arm 40 and 48 extending in opposite directions. The arm 40 is connected at a hinge or pivot joint 42 to an arm 38 associated with a linear actuator 36, and the arm 48 is connected at a hinge or pivot joint 50 to an arm 46 associated with a second linear actuator 44. The actuators 36 and 44 may be mounted in a motor housing. The arms 38 and 46 of the actuators 36 and 44 may be moved in any suitable manner. For example, the actuators 36 and 44 may be hydraulic cylinders or electric motors that move the arms 38 and 46, respectively. The vertical mobility of the arm 38 may be limited by a set of stops 52 and 54 while a set of guides 56 and 58 ensures that the arm 46 moves horizontally. The apparatus 10 can be arranged in a nested manner to form a compact configuration, such that the flywheel 16 and the crankshaft 12 are concentrically arranged with rotational axis A; circular coupling 22 through its arm 24 and coupling members 26 and 28 and also through crankshaft arm 14 provide the coupling between the flywheel 16 and crankshaft 12. The circular coupling 22 rotates about the axis B, which can be offset from the rotational axis A of the crankshaft 12 in a desired direction by controlling the linear displacement of the linear actuator 36 and 44. Due to the offset of the axis B from the axis A, the distance between the center point of pivot pin 32 and axis A varies as the crankshaft 12 rotates. As a result, pivot pin 32 moves close to and away from axis A as the crankshaft rotates, and therefore creates a relative oscillatory angular motion between the flywheel 16 and crankshaft 12. The phase and magnitude of the oscillatory angular motion of the flywheel 16 relative to the crankshaft 12 are determined by the position of the axis B. The position of axis B can be moved freely by actuators 36 and 44. If axis B moves to the position coincide with the axis A, the magnitude of the oscillatory of the flywheel 16 relative to the crankshaft 12 becomes zero.

In a particular arrangement, the actuators 36 and 44 are hydraulic cylinders, in which the hydraulic fluid is pressurized engine lubrication oil, so that no separate source of hydraulic pressure is required. The hydraulic cylinders are operated with controlled valves that are actuated by an electronic control device as a function of the load at each point of the internal combustion engine as required to suppress torque surge. The apparatus is suitable for use in reciprocating internal combustion engines or as well as rotary piston internal combustion engines. Instead of or in addition to the adjustability of the control ring 18, the flywheel 16 may formed so that its moment of inertia is changeable.

The apparatus 10 can be configured in different arrangements. For example, the flywheel 16 and its coupling with the crankshaft 12 can be arranged differently, such as, at one end of the crankshaft, or for multi-cylinder engines, among the pistons. On a crankshaft, several flywheels 16 and associated components may be provided.

As seen in FIG. 1, axis B is offset from the axis A maximally in −90 degree direction with the appropriate movement of the arms 46 and 38 by the actuators 44 and 36.

In FIG. 2, the axis A lines up with the axis B with the appropriate movement of the arms 46 and 38 by the actuators 44 and 36. Hence, the center of the control ring 18 is centered with the center of the crankshaft 12. Accordingly, the apparatus 10 moves from a state of maximum eccentricity (FIG. 1) to a state of minimum eccentricity as shown in FIG. 2. As such, the circular coupling 22 rotates coaxially with the crankshaft 12, where the relative position between the arm 14, the coupling members 26 and 28, and the radial arm 24 is constant, so that there is no relative angular motion between the flywheel and the crankshaft.

Turning to FIG. 3, the actuator 44 moves the arm 46 towards the crankshaft 12 and the actuator 36 moves the arm 38 to a position where the A axis and the B axis are aligned vertically but offset horizontally as shown in the figure. Accordingly, the center of the control ring 18 (which is the axis B) is off centered from that of the crankshaft 12 (which is the axis A) in the 0° direction. FIGS. 1 and 3 show the axis B off centered from axis A in −90° and −0° directions respectively; however, by operating actuator 36 and 44, axis B can be off centered in any direction.

The oscillatory angular motion of the flywheel 16 relative to the crankshaft 12 generates counter torque on the crankshaft. The phase and magnitude of the counter torque is determined by the position of the axis B (the center of the control ring 18). The actuator 36 and 44 control the position of axis B in the way such that the counter torque of the flywheel is always in the opposite direction of the engine combustion torque with an appreciable magnitude.

FIG. 3 shows a graph of engine torque and flywheel torque fluctuations over time. Specifically, the abscissa is the time and the ordinate indicates the engine combustion torque 60, the flywheel counter torque 62, and the net engine torque 64 resulting from the flywheel counter torque mitigating the engine combustion torque. With the appropriate use of the actuators 36 and 44, both the magnitude and the phase of the flywheel counter torque can be controlled. As can been seen in FIG. 3, the maximum engine combustion torque 60 is countered by the minimum flywheel counter torque and the minimum engine combustion torque is countered by the maximum flywheel counter torque, resulting in the net engine torque 64 with difference between the high and low torque values being significantly less than those of the engine combustion torque, which provides a much smoother operating engine.

The description of the invention is merely exemplary in nature and variations that do not depart from the gist of the invention are intended to be within the scope of the invention. Such variations are not to be regarded as a departure from the spirit and scope of the invention.

What is claimed is:

1. An apparatus for reducing torque fluctuations of a combustion engine comprising:
    a crankshaft mounted in the engine;
    a flywheel coupled to the crankshaft, the flywheel generating a counter torque to the torque generated by the engine during combustion; and
    a first actuator and a second actuator coupled to the flywheel, wherein the first and the second actuators are operated to adjust the magnitude and the phase of the counter torque generated by the flywheel to suppress fluctuations associated the engine torque.

2. The apparatus of claim 1 wherein adjusting the magnitude of the counter torque includes changing the rotational speed of the flywheel relative to the crankshaft.

3. The apparatus of claim 1 wherein the flywheel is coupled to the crankshaft through a circular coupling.

4. The apparatus of claim 3 wherein the circular coupling is coupled to a set of coupling members, one of which is coupled to an arm protruding from the crankshaft.

5. The apparatus of claim 3 further comprising a control ring, and wherein the circular coupling rotates coaxially about a control ring.

6. The apparatus of claim 5 wherein a pair of arms extend from the control ring in opposite directions, one arm being coupled to the first actuator and the second arm being coupled to the second actuator.

7. The apparatus of claim 6 wherein the crankshaft rotates about a first axis of rotation and the control ring pivots about a second axis of rotation parallel to the first axis of rotation.

8. The apparatus of claim 7 wherein the first and the second actuators are operated such that the first axis of rotation and the second axis of rotation are the same.

9. The apparatus of claim 7 wherein the first and the second actuators are operated such that the first axis of rotation and the second axis of rotation are offset, resulting in the pivoting of the control ring to be off centered from the rotation of the crankshaft.

10. The apparatus of claim 7 wherein the first and the second actuators are operated to vary the distance between the first axis of rotation and the second axis of rotation.

11. The apparatus of claim 1 wherein the actuators are electric motors.

12. The apparatus of claim 1 wherein the actuators are hydraulic cylinders.

13. The apparatus of claim 12 wherein the hydraulic cylinders contain pressurized hydraulic fluid, the hydraulic cylinders adapted to be operated with control valves that are actuated by an electronic control device as a function of the load at each point of the internal combustion engine as desired to suppress torque fluctuations.

14. A method of reducing torque fluctuations of a combustion engine comprising:
    rotating a crankshaft mounted in the engine;
    generating a counter torque with a flywheel to the torque generated by the engine during combustion, the flywheel being coupled to the crankshaft; and
    operating a first actuator and a second actuator coupled to the flywheel to adjust the magnitude and the phase of the counter torque generated by the flywheel to suppress fluctuations associated the engine torque.

15. The method of claim 14 wherein adjusting the magnitude of the counter torque includes changing the rotational speed of the flywheel relative to the crankshaft.

16. The method of claim 14 wherein the flywheel is coupled to the crankshaft through a circular coupling that rotates coaxially about a control ring.

17. The method of claim 16 wherein the crankshaft rotates about a first axis of rotation and the control ring pivots about a second axis of rotation parallel to the first axis of rotation.

18. The method of claim 17 wherein the first and the second actuators are operated such that the first axis of rotation and the second axis of rotation are the same.

19. The method of claim 17 wherein the first and the second actuators are operated such that the first axis of rotation and the second axis of rotation are off set, resulting in the pivoting of the control ring to be off centered from the rotation of the crankshaft.

20. The method of claim 17 wherein the first and the second actuators are operated to vary the distance between the first axis of rotation and the second axis of rotation.

\* \* \* \* \*